United States Patent [19]

Sakami et al.

[11] Patent Number: 4,839,854
[45] Date of Patent: Jun. 13, 1989

[54] DATA COLLECTION SYSTEM HAVING STATIONARY UNIT WITH ELECTROMAGNETIC INDUCTION CIRCUITRY FOR BIDIRECTIONALLY RELAYING DATA

[75] Inventors: Yasuo Sakami; Shigetaka Okina; Junichi Tsubouchi; Shozo Izaki; Toshitaka Fukushima; Hiroyuki Watanabe; Masao Ishizaki, all of Tokyo, Japan

[73] Assignee: Seiko Instruments & Electronics Ltd., Tokyo, Japan

[21] Appl. No.: 907,401

[22] Filed: Sep. 12, 1986

[30] Foreign Application Priority Data

Sep. 13, 1985 [JP] Japan .................. 60-202775
Sep. 13, 1985 [JP] Japan .................. 60-202776
Sep. 13, 1985 [JP] Japan .................. 60-202777
Sep. 13, 1985 [JP] Japan .................. 60-202778
Sep. 13, 1985 [JP] Japan .................. 60-202779
Sep. 13, 1985 [JP] Japan .................. 60-140495[U]
Sep. 13, 1985 [JP] Japan .................. 60-140497[U]

[51] Int. Cl.⁴ .................. G06F 13/00; G06F 3/00; G06F 15/16; G06F 15/74
[52] U.S. Cl. .................. 364/900; 364/484; 346/14 MR
[58] Field of Search ... 364/200 MS File, 900 MS File, 364/708, 709, 483, 493, 464, 484; 360/4, 6; 346/14 MR; 340/870.02

[56] References Cited

U.S. PATENT DOCUMENTS

| | | | |
|---|---|---|---|
| 3,512,139 | 5/1970 | Reynolds et al. | 364/900 |
| 3,823,388 | 7/1974 | Chadima et al. | 360/4 |
| 3,956,740 | 5/1976 | Jones et al. | 360/4 |
| 4,025,766 | 5/1977 | Ng et al. | 364/900 |
| 4,133,034 | 1/1979 | Etter | 364/464 |
| 4,211,065 | 7/1981 | Schmitz et al. | 368/47 |
| 4,277,837 | 7/1981 | Stuckert | 364/900 |
| 4,351,028 | 9/1982 | Peddie et al. | 364/483 |
| 4,384,288 | 5/1983 | Walton | 340/825.34 |
| 4,387,296 | 6/1983 | Newell et al. | 235/376 |
| 4,454,414 | 6/1984 | Benton | 235/379 |
| 4,459,474 | 7/1984 | Walton | 235/380 |
| 4,463,354 | 7/1984 | Sears | 340/870.02 |
| 4,491,793 | 1/1985 | Germer et al. | 324/157 |
| 4,523,087 | 6/1985 | Benton | 235/379 |
| 4,534,012 | 8/1985 | Yokozawa | 364/900 |

FOREIGN PATENT DOCUMENTS 0215646 3/1987 European Pat. Off. ............ 364/900
2129176 5/1984 United Kingdom .

Primary Examiner—Archie E. Williams, Jr.
Assistant Examiner—Ayni Mohomed
Attorney, Agent, or Firm—Bruce L. Adams; Van C. Wilks

[57] ABSTRACT

A system for collection of data and entry of the data to a host computer has a portable, hand held, data collector for collecting data and a stationary data relay for receiving the data from the data collector and for transmitting the data to the host computer. The portable hand held data collector includes a case of a size and shape to be held by one hand during use, a keyboard for inputting the data, displaying for displaying the data, memory for storing the data and an interface for transmitting the data to external. The data relay includes a case shaped to set the portable data collector thereon, of first interface for receiving the data transmitted from the data collector and of said interface for comunicating bidirectionally to the host computer.

3 Claims, 14 Drawing Sheets

F I G. 13
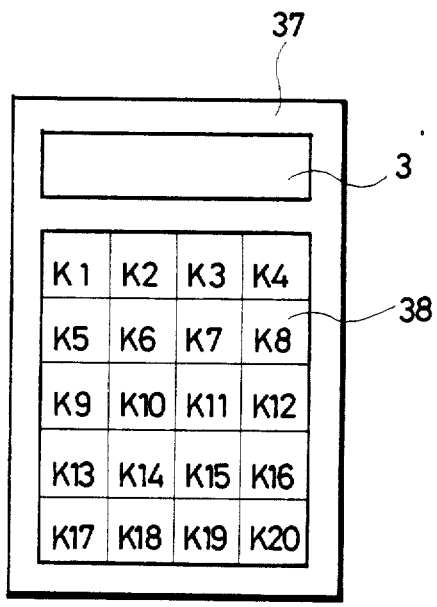
F I G. 14
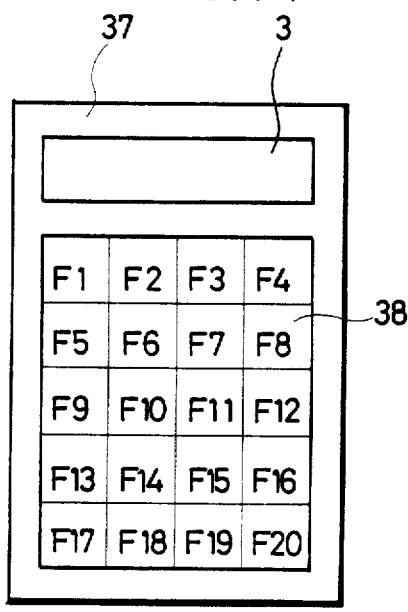
F I G. 15
| ADDRESS CORES. TO K1 | ADDRESS OF F1 |
| ADDRESS CORES. TO K2 | ADDRESS OF F2 — 44 |
| ADDRESS CORES. TO K3 | ADDRESS OF F3 |
| ADDRESS CORES. TO K4 | ADDRESS OF F4 |
| ADDRESS CORES. TO K5 | ADDRESS OF F5 |
| ⋮ | ⋮ |
| ADDRESS CORES. TO K20 | ADDRESS OF F20 |

| ADDRESS CORES. TO K1 | ADDRESS OF F21 |
| ADDRESS CORES. TO K2 | ADDRESS OF F22 |
| ADDRESS CORES. TO K3 | ADDRESS OF F23 |
| ADDRESS CORES. TO K4 | ADDRESS OF F24 |
| ADDRESS CORES. TO K5 | ADDRESS OF F5 |
| ⋮ | ⋮ |
| ADDRESS CORES. TO K20 | ADDRESS OF F20 |

DATA COLLECTION SYSTEM HAVING STATIONARY UNIT WITH ELECTROMAGNETIC INDUCTION CIRCUITRY FOR BIDIRECTIONALLY RELAYING DATA

BACKGROUND OF THE INVENTION (i) Field of the invention

This invention generally relates to a data collecting system and more particularly to a system according to which portable data collectors are carried by the users to collect the data, and the data are transferred to a central processing unit so as to be processed and stored therein.

(ii) Description of the Prior Art

A conventional data collecting system consists of connecting portable data collectors directly to a central processing unit via a communication line, in order to transmit and receive the data.

In the conventional data collecting system, however, the portable data collectors are provided with an interface circuit that connects to the host computer. Further, the interfaces that connect to the central processing unit require an interface circuit or a connector that meets the ratings such s EIA RS 232C or RS 422, making it difficult to reduce the size and weight or to make the device moisture-proof. Moreover, the data collectors are used at all times being powered by a cell. To restrain the consumption of current by the circuits, therefore, it is not feasible to use clock signals of a high frequency, and the transmission speed of the interfaces is 9600 bps at the greatest. Furthermore, the connector which is attached and detached repetitively loses its reliability. Moreover, since the data are transferred in a one-to-one manner between the portable data collector and the host computer, one of the portable data collectors occupies the central processing unit, and other portable data collectors must wait for their turns. Therefore, the efficiency of data transfer is very poor.

Even if the host computer transfers the same data which requires a long time for transferring to a plurality of portable data collectors, the central processing unit has to transfer the data to each portable data collector sequentially, and so it causes a waste of time.

SUMMARY OF THE INVENTION

According to a preferred embodiment of this invention there is provided a system for collection of data and entry of the data to a host computer wherein the system comprises a portable, hand held, data collector, for collecting data and a stationary data relay for receiving the data from the data collector and for transmitting the data to a host computer. The portable hand held data collector includes a case of a size and shape to be held by one hand during use, a keyboard for inputting the data, display means for displaying the data, memory means for storing the data and interface means for transmitting the data externally to the data collector, the data relay includes a case shaped to set the portable data collector thereon, first interface means for receiving said data transmitted from the data collector and second interface means for communicating bi-directionally to the host computer.

It is therefore an object of this invention to provide a system which exhibits a high transmission speed relative to the host computer. It is another object of this invention to provide a portable data collector which is small in size, light in weight, and which is moisture-proof.

It is a further object of the invention to provide as system which consumes low electric power.

BRIEF DESCRIPTION OF THE DRAWINGS

FIG. 13 is a front view of a portable data collector showing arrangement of the keys of the data collector;

FIG. 14 is a diagram of key functions that are allotted to the data collector;

FIG. 15 is a diagram which illustrates the contents of the key process correspondence memory;

DESCRIPTION OF PREFERRED EMBODIMENTS

Figure 1:
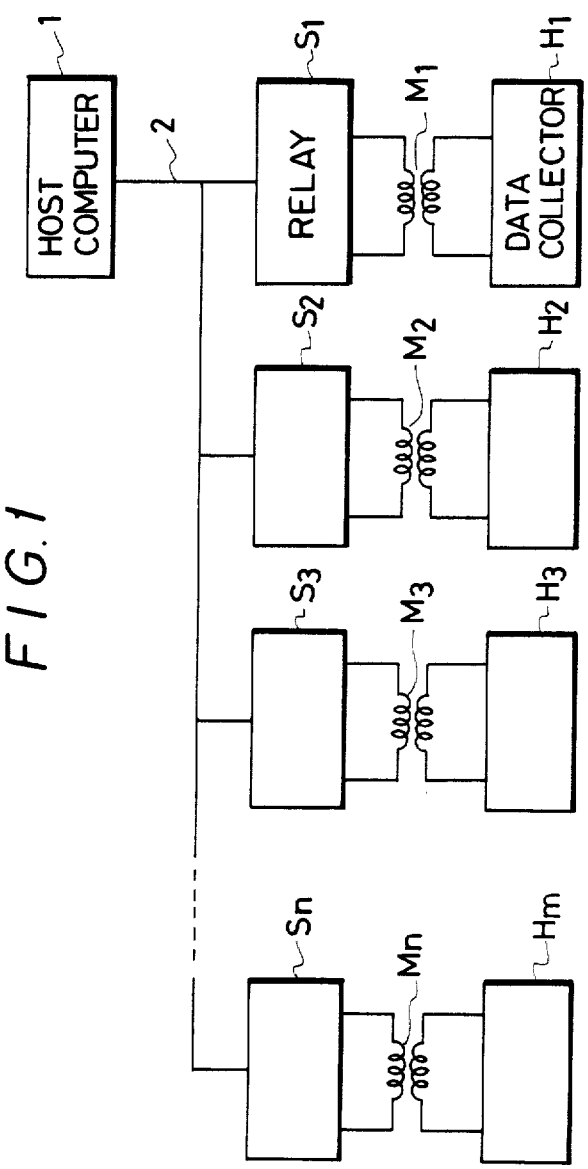
FIG. 1 is a diagram showing the whole structure of a data collecting system according to the present invention.
Figure 2:
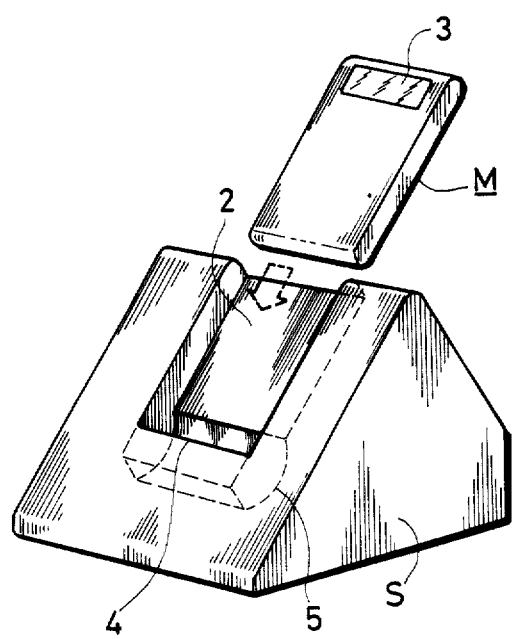
FIG. 2 is a perspective view of a portable data collector and a data relay.

Referring now to the accompanying drawings stationary data relays S1 to Sn shown in FIG. 1 are placed between portable data collectors H1 to Hm and a Host Computer 1, the communication is not performed directly between the portable data collector H1 to Hm and the Host Computer 1 but is performed relative to the data relays so as to be stored therein, and the data are sent to the other unit from the data relays S1 to Sn. The communication between the portable data collector H and the data relays are performed by an electromagnetic induction circuits M1 to Mn employing a coil, in order to eliminate the connector and to simplify the interface circuit. The portable data collectors H1 to Hm are coupled to data relays S1 to Sn via electromagnetic induction circuits M1 to Mn. When the portable data collectors H1 to Hm are being carried, the data relays S1 to Sn are not coupled to the portable data collectors H1 to Hm, but wait for receiving the data. Further, the data relays S1 to Sn and the portable data collectors H1 to Hn can be freely combined, and their numbers can be freely selected. FIG. 2 shows a method of setting the portable data collectors H1 to Hm' to the data relays S1 to Sn. If the portable data collector H1 is inserted and coupled into the data relay S1, the data input to the portable data collector H1 are at once stored in the RAM of the data relay S1. The Host Computer successively asks the data relays S1 to Sn in regard to whether there are data via a communication line 2. Only when there are data, the data are transmitted and received between the Host Computer 1 and the data relay S1, and the data in the portable data collector H1 are sent to the Host Computer 1. During this moment, other data relays S2 to Sn must wait for communications with the Host Computer 1. The communication line 2 is formed by either wire or radiowave. The data relays S1 to Sn are powered by AC power supply or large capacity DC power supply.

In the above-mentioned system, the data flow as described below. That is, when the data are to be transmitted from a portable data collector to the Host Computer, both the data collector and the data relay have a coil so that the data are transferred from the data collector to the data relay by the electromagnetic induction at such a low speed as 2400 bps, and are temporarily stored in the RAM in the data relay and, then, the data are transferred from the data relay to the central processing unit via a communication line at a speed as high as 9600 bps or more. In this case, it is also possible to change the data format. When the data are to be transferred from the Host Computer to the portable data collector, the flow of data is reversed. The interface between the portable data collector and the data relay is formed by using a coil in the casing without using a connector. Therefore, the device exhibits excellent moisture-proof property. Further, since there is no connector to be attached or detached, the reliability is not deteriorated. Moreover, since the transmission speed is as low as 2400 bps, the clock signal frequency can be maintained small to consume reduced amounts of electric current. It is further allowed to use a button-type lithium cell or a like cell, contributing to reducing the size and weight. Further, the communication is effected between the Host Computer and the data relay at such a high speed that a problem is solved in that a communication line is occupied by a portable data collector which makes the communication, and the transmission or reception of data from other portable data collectors must be waited for.

STATIONARY DATA RELAY

Figure 3:
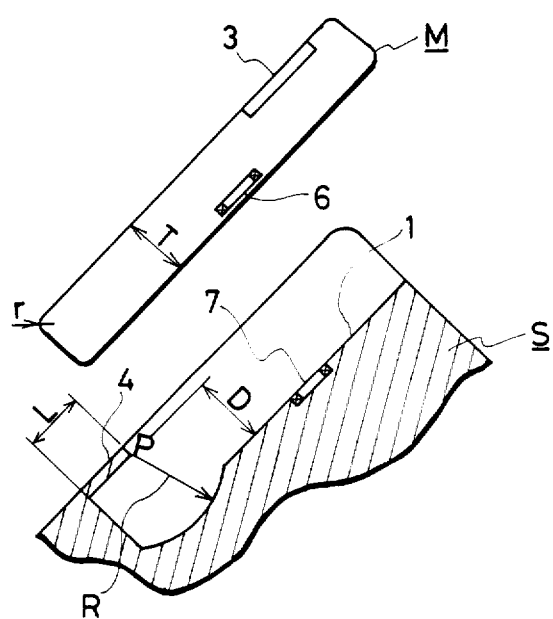
FIG. 3, 4 and 5 are sectional views of major portions of the data relay according to the present invention.

The stationary data relay serves for relaying data bidirectionally between the Host Computer and portable data collector by setting the data collector on a receiving surface 2 shown in FIG. 2. The receiving surface 2 is inclined by about 30 to 60 degrees so that the display unit 3 can be easily seen by an operator. An overhang 4 is provided at a portion of the data relay S to receive the portable data collector M in parallel with the receiving surface 2 which is provided with a recess having a curved surface 5 of a radius R with the edge P of the overhang as a center as shown FIG. 3. The curved surface 5 is made similar to a locus that is drawn when the data collector M is turned with the edge P of the overhang as a center.

The data relay and the data collector have respectively a coil 7, 6 for communication in a responsive portion to each other when the data collector is set on the data relay. Because the receiving surface is inclined, the coil 9 is brought into intimate contact with receiving surface 2, so that it is placed in position relative to the coil 7.

Figure 4:
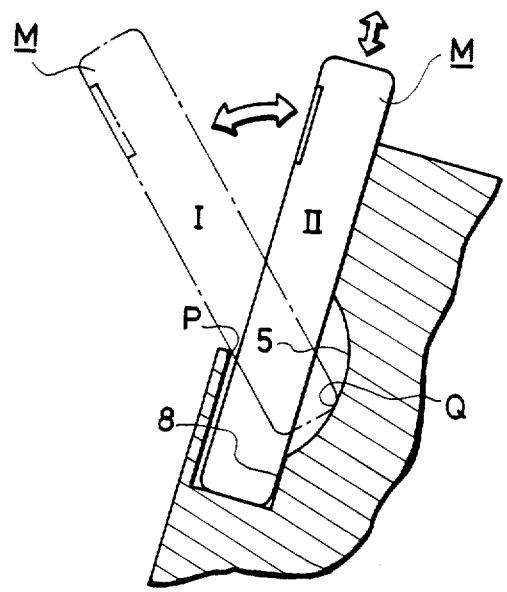

According to this embodiment, the data collector can be attached and detached favorably if the ratios are selected to be $T:D:L:R \approx 5:6:5:8$. Further, the bottom of the portable data collector M is rounded as denoted by r, so that it can be handled desirably. FIG. 4 is a section view of an embodiment where the angle of inclination is 60 to 90 degrees. If the angle of inclination is close to 90 degrees, the portable data collector M may fall down forwardly. Therefore, a straight portion 8 is provided under the curved surface 5, so that the portable data collector M is prevented from falling down forward by means of the edge P of the overhang and the straight portion 8.

Figure 5:
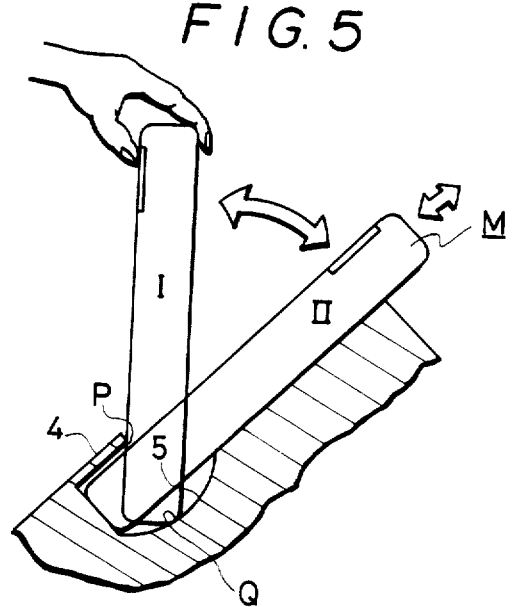

As shown in FIG. 4 and 5 the portable data collector M can be inserted in the receiving portion with an attitude of either I or II. When it is inserted with the attitude of I, a portion Q of the portable data collector M slides on the curved surface 5 of the receiving portion, so that the attitude of the data collector is changed from I to II. To take out the portable data collector M, it may be tilted forward; i.e., the portable data collector turns with the edge P of the overhang·P as a center, and is taken out without any trouble. Further, the overhang 4 prevents the portable data collector M from escaping.

Figure 6:
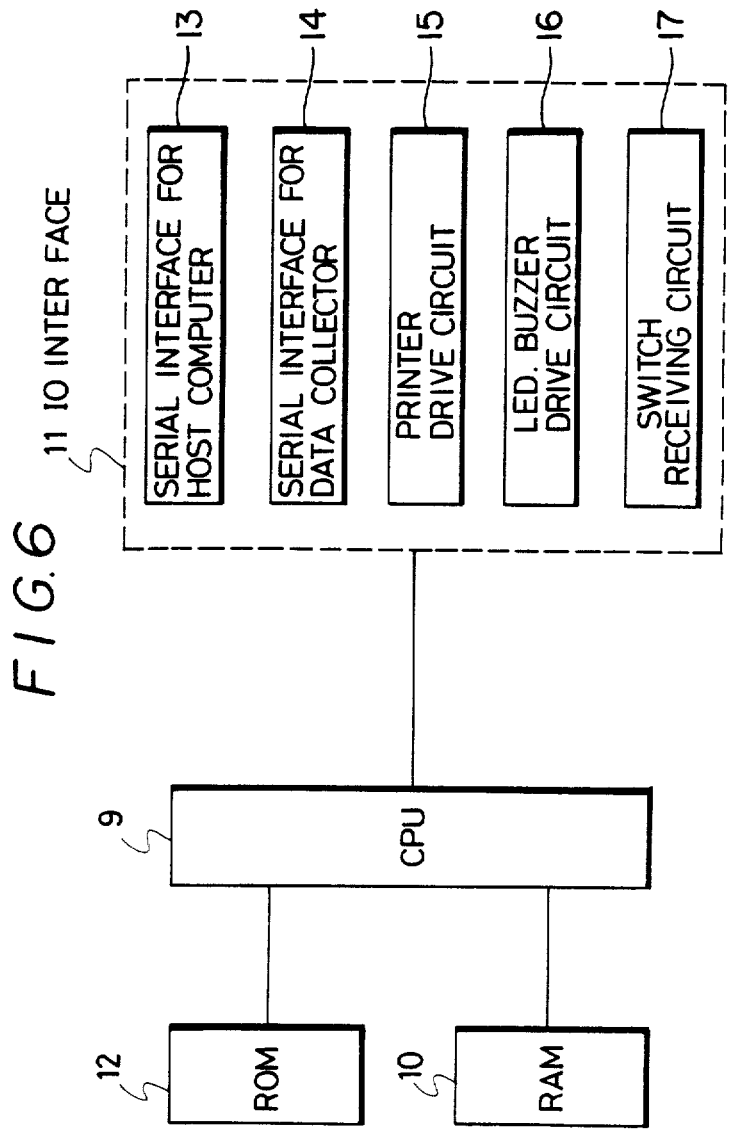
FIG. 6 is a block diagram of the data relay according to the present invention.

A circuitry block diagram of the stationary data relay is shown in FIG. 6. A CPU 9 controls a RAM 10 and an I/O interface 11 in accordance with a program stored in a ROM 12. The data are transferred to, and received from the Host Computer 1 by a serial interface 13 relative to the central processing unit. The data are further transferred to, and received from, the portable data collector by a serial interface 14 relative to the portable data collector. A printer drive circuit 15 executes handshaking with the printer and produces a print output. A circuit for driving the LED and buzzer 16 controls the LED and buzzer. A switch receiving circuit 17 informs the CPU 12 of the fact that the switch is depressed.

Figure 7:
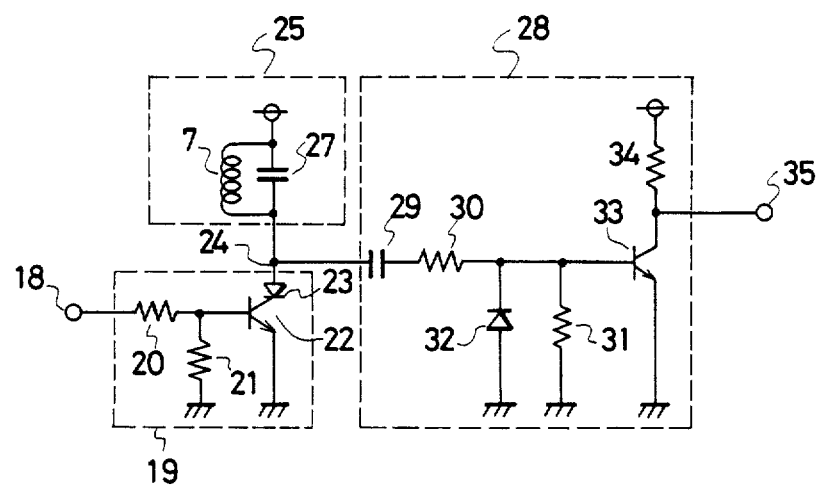
FIG. 7 is a circuitry diagram of part of a serial interface for the data collector.

If it is detected by the switch receiving circuit 17 that the portable data collector is mounted on the data relay, the data are transferred to, and received from, the portable data collector via the serial interface 14 relative to the portable data collector, and the data that are received are temporally stored in the RAM 10. Simultaneously with the above-mentioned procedure or after the above-mentioned procedure has been finished, the data are transferred to, and received from, the Host Computer Via the serial interface 13 relative to the Host Computer. The circuit 16 for driving the LED and buzzer indicates that the data are being transferred. Moreover, the printer drive circuit 15, messages from the portable data collector, from the central processing unit, or from the data relay, are output to the printer. When an error has occurred during the above-mentioned procedure, the circuit 16 for driving the LED and buzzer informs the users of the occurrence of the error. If the Host Computer transfers the same data to a plurality of portable data collectors, the data relay stores perpetually the data sent from the Host Computer into RAM and then the data relay transfers the stored data to a plurality of portable data collectors. A circuitry diagram of the serial interface 6 relative to the portable data collector is shown in FIG. 7. A transmitting terminal 18 for inputting a signal thereto from CPU, the signal represents the data to be transmitted to the portable data collector and is connected to a transmitting unit 19 which consists of resistors 20 and 21, a transmitting transistor 22 and diode 23. The anode terminal of the diode 23 is connected, via a contact point 24, to a tuning unit 25 which consists of a transmitting-/receiving antenna coil 7 and a tuning capacitor 27 that are connected in parallel with each other.

A receiving circuit 28 comprises a coupling capacitor 29, resistors 30 and 31, a clipping diode 32, a receiving transistor 33, and a resistor 34, and includes a high-pass filter which consists of the capacitor 29 and the resistors 30, 31 and which is connected, via the contact point 24, to the transmitting unit 19 and to the tuning unit 25. The receiving terminal 35 is connected to the collector of the receiving transistor 33.

The signal input to the transmitting terminal 18 is sent to the base terminal of the transmitting transistor 22 via a transistor drive unit which consists of the resistors 20 and 21, and causes the transmitting transistor 22 to be switched. When the transmitting transistor 22 is rendered conductive, the contact point 24 assumes the ground level. When the transmitting transistor 22 is rendered nonconductive, the contact point 24 assumes a high level to excite the transmitting/receiving antenna coil 7. Under this condition, the signal is transmitted to the base of the receiving transistor 33 via coupling capacitor 29, resistor 30, clipping diode 32 and resistor 31, to render the receiving transistor 33 off or on. Consequently, a signal appears on the receiving terminal 35 having a phase opposite to that of the signal input to the transmitting terminal 18. Here, if the terminal 24 is poorly connected or if the transmitting/receiving antenna coil 7 is broken, the receiving transistor 33 remains non-conductive irrespective of whether the transmitting transistor 22 is rendered conductive or nonconductive, and the signal being transmitted does not appear on the receiving terminal 35.

On the another hand a excessive signal is inputted to the transmitting terminal 18 or if supply noise is generated, diode 23 prevent a current from base to collector.

The serial interface 13 relative to the central processing unit may employ the same circuit as one of the serial interface 14 above described. Also the serial interface may employ a EIA standardized interface, for example RS 422 or RS 232C for high speed interface.

PORTABLE DATA COLLECTOR

Figure 8:
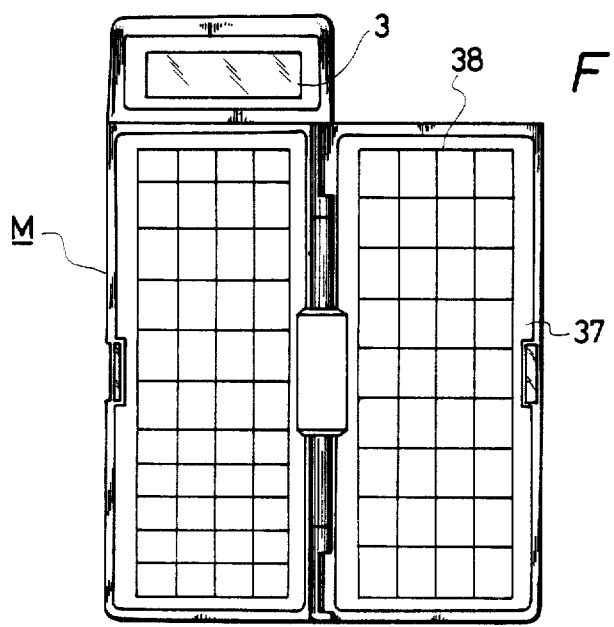
FIG. 8 is a diagram showing the appearance of the portable data collector according to the present invention.

The portable data collector M for collecting the data and for transfering the data to the stationary data relay has the display unit 3 located on the upper portion of the case 37 as shown in FIG. 2. The portable data collector also has input keys 38. These input keys 38 are arranged on both inner sides of the case 37 able to open as shown in FIG. 8. When a user inputs data, the user opens the case 37 and depresses the keys 38.

Figure 9:
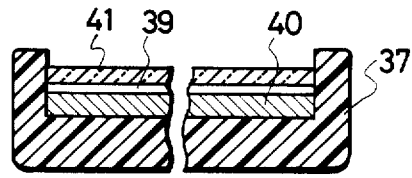
FIG. 9 is a sectional view of an input key of the portable data collector.

FIG. 9 is a section view of an input key, wherein a menu paper 39 describing menus is placed on a membrane switch 40 and the surface of the menu paper is protected by a protecting sheet 41. The menu paper 39 consists of a paper produced from a printer and describes menus that are printed thereon. The protecting sheet 41 has lines to meet the keys of the membrane switches 40. Each key has four menus and any one of them is selected by depressing a select key (not shown) in advance.

Figure 10:
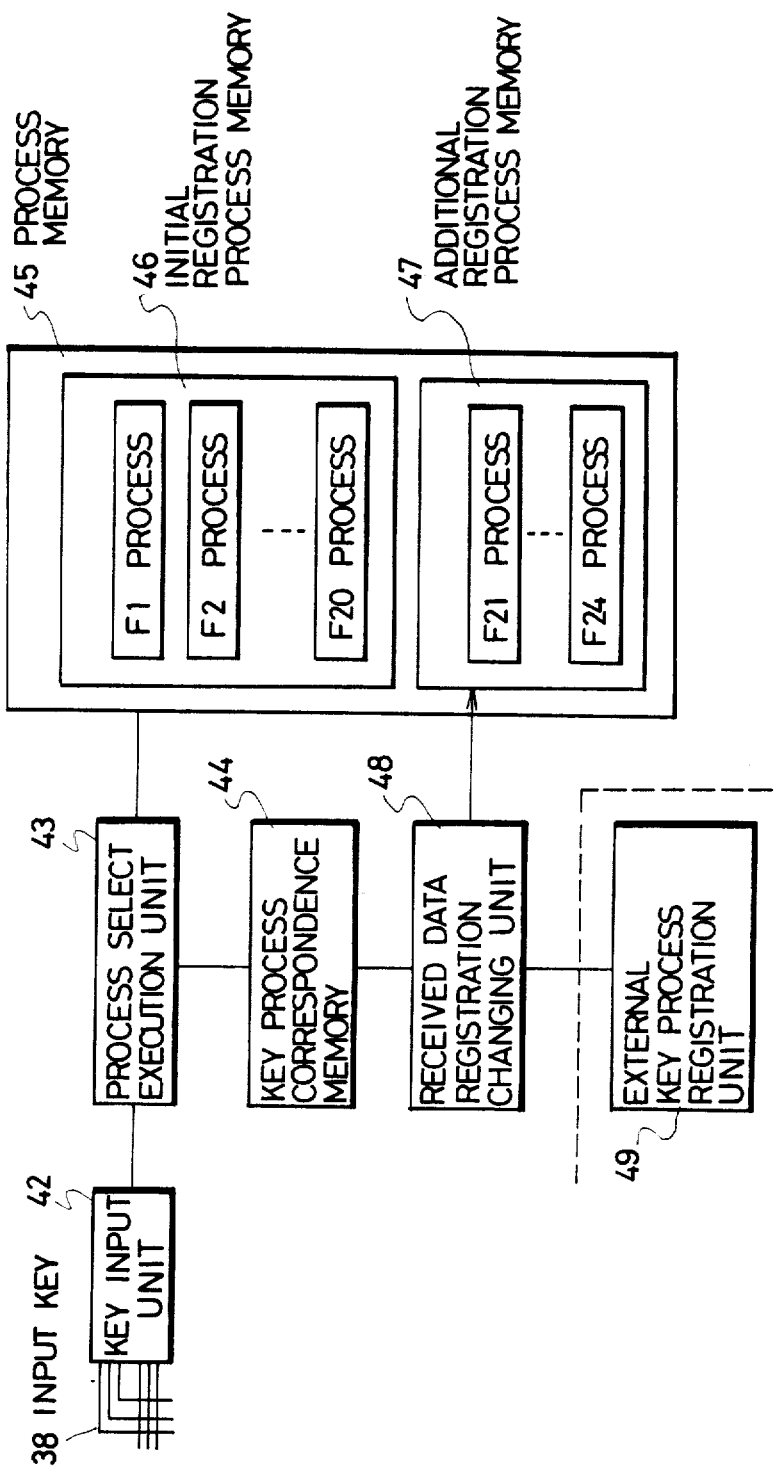
FIG. 10 is a functional block diagram of the data collector.

FIG. 10 is a functional diagram of the portable data collector.

The portable data collector registers processes received from an external unit and addresses of processes corresponding to all of the keys in the RAM.

The addresses are changed by an external unit, so that the functions of given keys can be changed.

A key input means 42 is connected to a process select execution means 43. A key process correspondence memory 44 and a process memory 45 are also connected to the process select execution means 43. The process memory 45 consists of an initial registration process memory 46 and an additional registration process memory 47. The key process correspondence memory 44 and the additional registration process memory 47 are connected to a received data registration changing means 48 which receives signals sent from an external key process registration means 49.

If now a key is input from the key input means 42, the process select execution means 43 selects a process that corresponds to the key from the key process correspondence means 44. The content of the selected process is registered in the initial registration process memory 46 or in the additional registration process memory 47 in the process memory 45 and the process select execution means 43 looks in the process memory 45 for a process that is selected from the key process correspondence memory 44 and executes the process. Under the initial condition, there is no content in the additional registration process memory 47. The additional registration process memory 47 is used for the first time when a process is registered therein by the external key process registration means 49 via the received data registration changing means 48. In response to signals from the external key process registration means 49, the received data registration changing means 48 registers the process into the additional registration process memory 47 and changes the content of the key process correspondence memory 44. The key process correspondence memory 44 stores the correspondence of processes relative to the keys. By registering a new process into the additional registration process memory 47 from the external key process registration changing means 49 in order to change the process of the key process correspondence memory 44 relative to the keys, it is allowed to change the functions of any keys.

Figure 11:
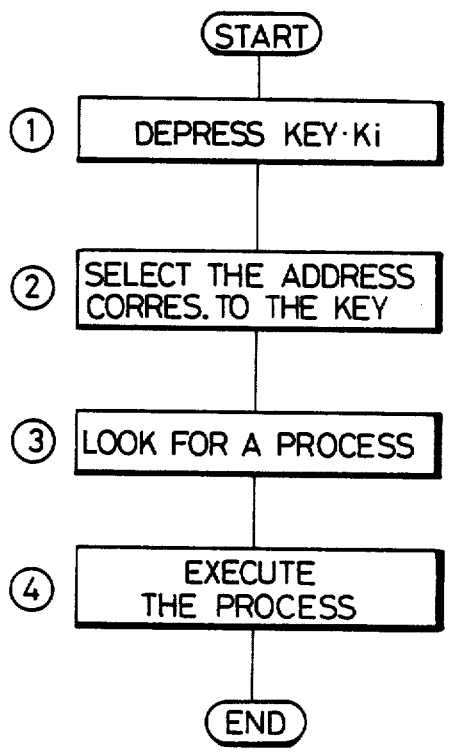
FIG. 11 is a flow chart illustrating the process by a process select means.
Figure 12:
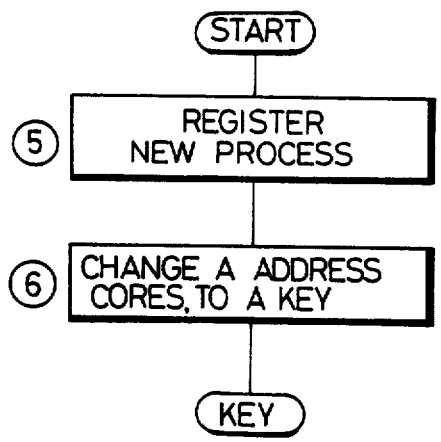
FIG. 12 is a flow chart illustrating the operation for changing the key function.

FIG. 11 is a flow chart showing the flow of operation of the process select execution means 43, and FIG. 12 is a flow chart of the operation for changing the key functions. The invention will now be explained in conjunction with these flow charts. In FIG. 11, a key Ki is depressed at a step (1). The process select execution means 43 selects from the key process correspondence memory 44 the address of a process that corresponds to the key Ki at a step (2). The process select execution means 43 looks in the process memory 45 for a process represented by the address of the selected process at a step (3), and executes the process at a step (4). By changing the address of the process corresponded to the key in the key process correspondence memory 44, therefore, the key function can be changed. When a new function that has not been registered in the process memory 45 is to be possessed by the key, the process should be newly registered from the external key process registration means 49 via the received data registration changing means 48. In FIG. 12, a new process is registered in the additional registration process memory 47 from the external key process changing means 49 via the received data registration changing means 48 at a step (5). Next, at a step (6), a key portion to change the function of the key process correspondence memory 44 is changed into the address of a newly registered process by the external key process changing means 49 via the received data registration changing means 48.

Figures 16, 17:
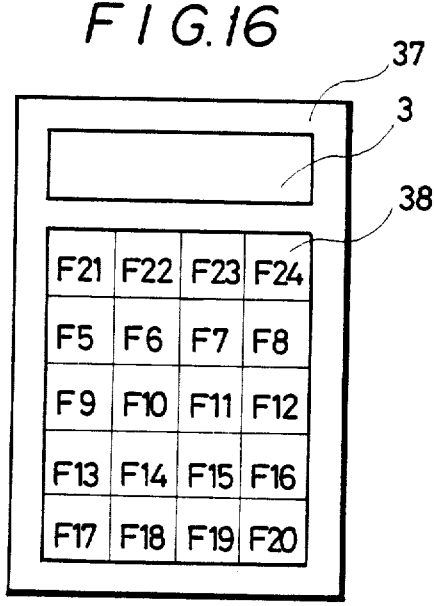
FIG. 16 is a diagram which illustrates a partly modified key function.
FIG. 17 is a diagram showing the contents of the key process correspondence memory.

How the key functions are changed will now be described by way of a concrete example of FIGS. 13 to 17. FIG. 13 is a diagram of the portable data collector having 20 keys K1 to K20. FIG. 14 is a diagram in which functions F1 to F20 are allotted to the Keys K1 to K20. That is, FIG 14 describes the functions of the keys in such a manner that a process F1 is performed if the key K1 is depressed, and a process F2 is performed if the key K2 is depressed. FIG. 15 shows the contents of the key process correspondence memory 44 that satisfy the key functions of FIG. 14. The address of the process F1 enters into a portion where is stored the address of a process that will be executed when the key K1 is depressed. Similarly, the address of the process F2 enters into a portion that corresponds to the key K2. Further, the addresses of processes F1 to F20 are entered to correspond to the keys K1 to K20. The processes F1 to F20 are registered in the initial registration process memory 46 in the process memory 45, but are not registered in the additional registration process memory 47. In practice, any processes may be referred to as the processes F1 to F20; e.g., the key that is registered at first may be processed. If now the key K1 is depressed, this fact is informed from the key input means 42 to the process select execution means 43. The process select execution means 43 selects, from the key process correspondence memory 44, the address of a process which corresponds to the key K1. Here, since the contents of the key process correspondence memory 44 are as shown in FIG. 15, the process F1 is selected and is executed. The practical contents of the process F1 are stored in the initial registration process memory in the process memory 45. By forming the key process correspondence memory 44 as shown in FIG. 15, the key functions can be arranged as shown in FIG. 14. Next, with reference to FIG. 16, the processes F5 to F20 are effected in the same manner as described above without changing the functions of the keys K5 to K20, but changing the processes F1 to F4 of the existing functions of the keys K1 to K4 into the processes F21 to F24 that have not been registered in the process memory 45. The processes F21 to F24 are newly registered in the additional registration process memory 47 in the process memory 45 by the external key process registration means 49 via the received data registration changing means 48. The contents of the key process correspondence memory 44 are then changed as shown in FIG. 17 by the external key process registration means 49 via the received data registration changing means 48. Namely, the address of process F21 is entered into a portion in which is entered the address of process of key K1, and similarly, F22 is entered into K2, F23 is entered into K3, and F24 is entered into K4. Therefore, if the key K1 is depressed, the process select execution means selects the process F21 that corresponds to the key K1 in the key process correspondence memory 44 of FIG. 17, and executes the process that is stored in the additional registration process memory 47. The key functions are thus arranged as shown in FIG. 16. As described above, new functions can be imparted to given keys by registering processes from an external unit into the additional registration process memory 47 and by changing the contents in the key process correspondence memory 44.

Figure 18:
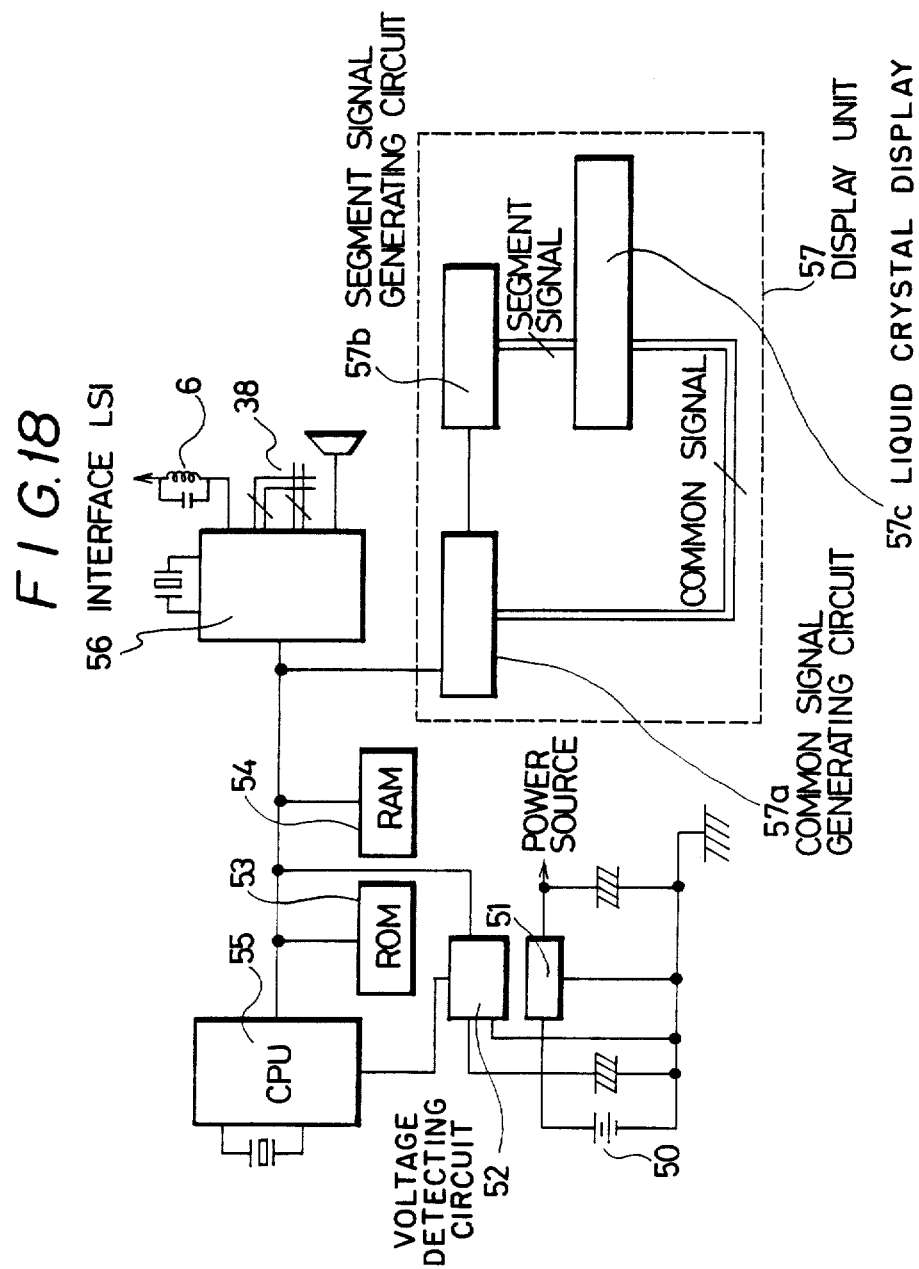
FIG. 18 is a block diagram of the portable data collector.

FIG. 18 is a circuitry block diagram of the portable data collecter which realizes the functions abovementioned. Two high-performance lithium batteries are connected in series to form a cell 50, and a constant voltage of three volts is obtained through a power source circuit 51. The consumption of electric current increases with the increase in the power source voltage. As the power source voltage decreases, on the other hand, the operation frequency of each IC decreases and the system becomes defective. A voltage of three volts is suitable for this system. A cell voltage detecting circuit 52 works to detect the drop in the cell voltage, and is indispensable from the standpoint of collecting the data. Details of the circuit will be described later. A ROM 53 stores an initial program which is necessary for starting the system and a subroutine that is frequently used. Practical procedure for collecting data and items of input keys are all written onto a RAM 54 from the data relay by the electromagnetic induction through a transmitting/receiving coil 6 and an interface LSI that controls the coil 6. The CPU 55 and the interface LSI 56 have an oscillating circuit, respectively, and generate clock signals necessary for the driving. The CPU 55 oscillates at about 1 MHz, starts to oscillate only when an interrupt signal is received from the interface LSI 56 in response to key input or transfer of data, and ceases to oscillate after a predetermined process has been finished. The interface LSI 56, on the other hand, oscillates at all times. A cheaply constructed tuning fork-type quartz oscillator which oscillates at 38.4 KHz can be used. A tuning fork-type quartz oscillator for timekeeping device which oscillates at 32,768 Hz is cheaper since it is used in large amounts. However, a quartz oscillator which oscillates at 38.4 KHz is used when it is required to set the transfer speed relative to the external unit to be an integral multiple of a standard value of 1200 bps. Thus, the oscillating circuit is divided into two, and the one on the CPU 55 side is not operated except for a required moment, so that the consumption of current is greatly reduced in average. The interface LSI 56 further has a communications control function necessary for the data communication, a function for controlling the input keys 38, a function for generating an operation confirmation sound signal, and a function for controlling a variety of CPU's 55 and the display unit 57. The volume of operation confirmation sound can be increased or decreased. A circuit for coupling to the data relay may employ the same circuit shown in FIG. 7.

A display unit 57 consists of a common signal generating circuit 57a, a segment signal generating circuit 57b, and a multi-character-dot-matrix liquid crystal display 57c. The liquid crystal display must be driven by ac signals to prevent it from deteriorating, and its contrast is adjusted by changing the amplitude of the ac signals. The portable data collector which has collected the data then transfers the data to an external unit. At this moment, signals are transferred from the interface LSI 56 to the data relay device via the transmitting-/receiving coil 6. After the data have been transferred, the contrast is decreased to decrease the consumption of electric current by the multi-character-dot-matrix liquid crystal display 57c.

Figure 19:
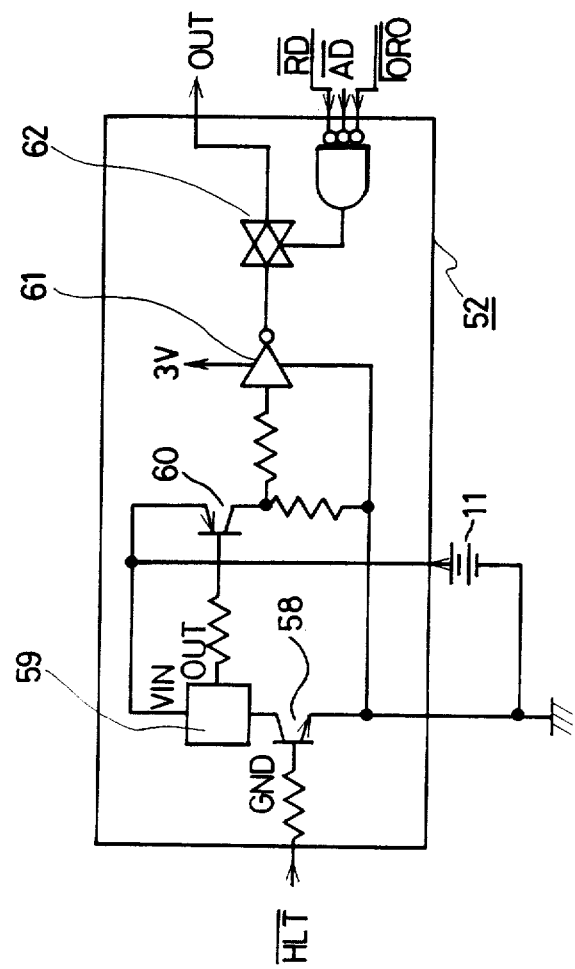
FIG. 19 is a circuitry block diagram of voltage detector of the data collector.

FIG. 19 is a diagram which illustrates in detail the cell voltage detecting circuit 52 of FIG. 18. When the CPU 55 is not in operation, an HLT signal assumes the "L" level, whereby a transistor 58 is rendered nonconductive to interrupt the supply of power to a voltage detecting element 59, to thereby decrease the consumption of electric current. When the power source voltage is greater than about 3.3 volts, the voltage detecting element 59 directly produces the power source voltage. Since a new cell produces a voltage of as great as 6 volts, the voltage detecting element cannot be directly connected to the CPU 55. Therefore, the level is changed through a transistor 60. When the cell voltage is normal, furthermore, the transistor 60 is rendered nonconductive so that no electric current is consumed. When the cell voltage drops to lower than 3.3 volts, the element is not destroyed since the difference is small relative to the power source voltage of an inverter 61 of the next stage. The output of the inverter 61 passes through a CMOS analog switch 62, and is read as an IO output into the data of the CPU 55.

Figure 20:
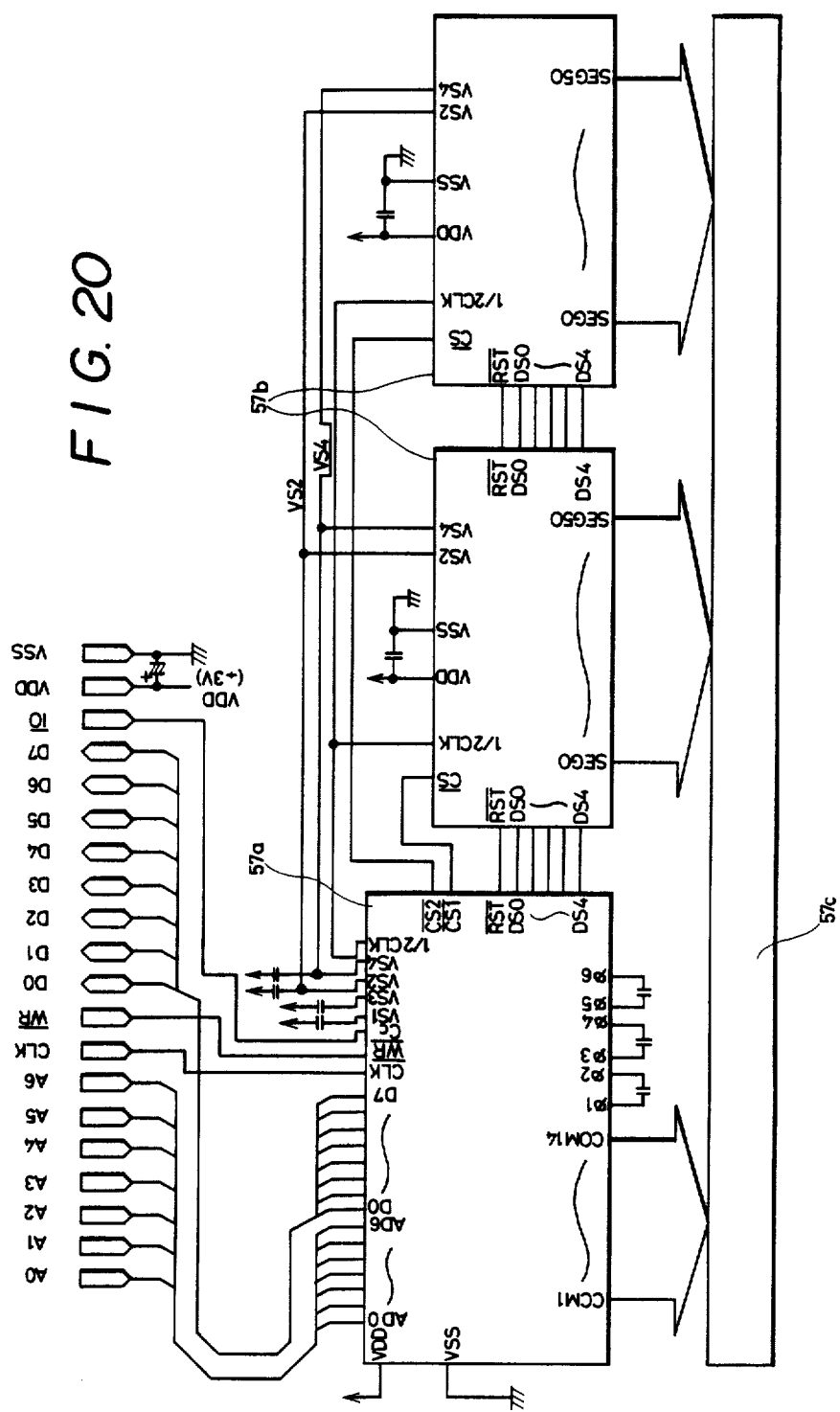
FIG. 20 is a block diagram of a display unit of the data collector.

The display unit 57 will now be described in detail with reference to FIG. 20. The common signal generating circuit 57a contains a display RAM and a character ROM (which are not shown), and is connected to the CPU 55 through an address bus, a data bus and other signal lines. As a signal is sent in the form of ASC II codes or the like from the CPU 55, the common signal generating circuit 57a converts it into a character pattern data, latches it, sends the data to the segment signal generating circuit 57b, and generates a common signal which will be sent to the multi-character-dot-matrix liquid crystal display 57c. In response to the character pattern data from the common signal generating circuit 57a, the segment signal generating circuit 57b generates segment signals that correspond to dots of the multi-character-dot-matrix liquid crystal display 57c. The contrast is changed by changing the peak values of common signals and segment signals by using a booster circuit in the common signal generating circuit 57a.

Figure 21:
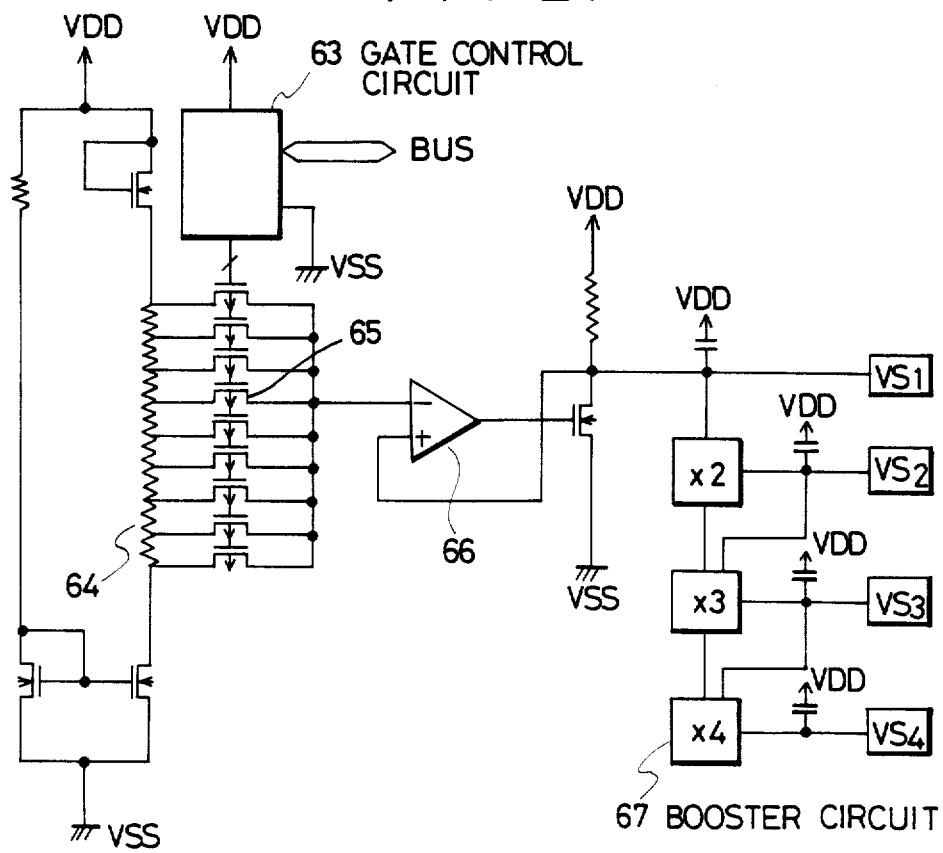
FIG. 21 is a block diagram of part of a common signal generating circuit.

FIG. 21 is a diagram illustrating a part of the common signal generating circuit 57a. A gate control circuit 63 operates depending upon the contrast data sent over the address bus and the data bus. A dividing resistor 64 is driven on a constant current, and a potential at a given connection point is taken out by an analog switch 65 controlled by the gate control circuit 63 and by a voltage follower 66.

Figure 22:
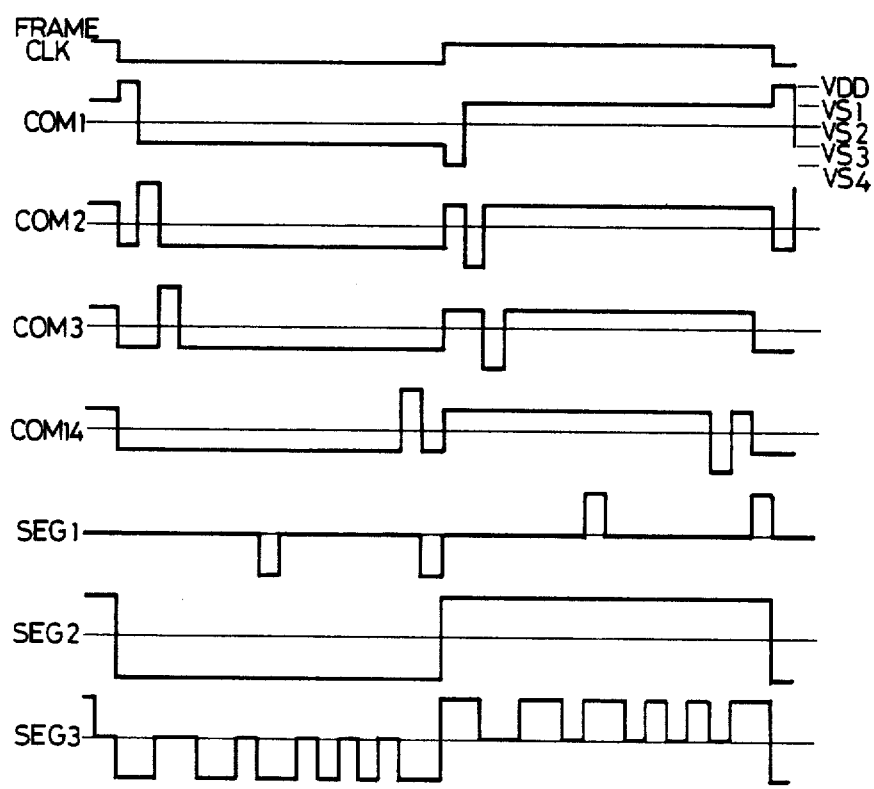
FIG. 22 is a timing chart of common signal and segment signal.

FIG. 22 shows common signals and segment signals. The common signals have peak values of four levels and the segment signals have peak values of three levels. The display element does not turn on when the difference between the signals is one level but turns on when the difference between the signals is four levels.

The liquid crystal display element can generally be regarded as a capacitor which, when an ac voltage is applied thereto, permits a current to flow through them depending upon the amplitude and the frequency. An ac voltage of a certain value is normally applied also to those segments that are not turned on, so that a current flows through them even when the polarity of the signal is changed. The current that is consumed while the CPU 55 is not in operation consists of a current that flows through the interface LSI 56 and the display unit 57, and a current that flows through the liquid crystal display elements. The multi-character-dot-matrix liquid crystal display 57c is considered to be composed of a great number of capacitors, and consumes a large current to produce the display. Considered below is the case where the contrast is decreased. As the output of the booster circuit decreases, peak values of the common signals and the segment signals decrease, whereby the amplitude of the ac voltage applied to the liquid crystal display elements decreases and the current flowing through them decreases. This is the condition where the contrast is decreased. Here, attention should be given to the fact that a dc voltage should not be applied to the liquid crystal display elements to prevent them from deteriorating.

The CPU 55 operates for a very short period of time, and an average current is considerably smaller than that which flows into the CPU 55 when it is not in operation. Therefore, to decrease the current that is consumed when the CPU 55 is not in operation serves as a key to the cell system.

The cell life will be calculated below based upon practical examples.
(1) It is presumed that the data are input and are transferred requiring a time of one hour.
(2) The CPU consumes a current of 1.2 mA when it is in operation. In the portable data collector which consumes a small current, however, the CPU is usually not in operation.
(3) When the CPU is not in operation, the current being consumed is 40 uA when the contrast is the greatest and is 20 uA when the contrast is the smallest.
(4) If the CPU operates for 100 seconds a day, the average current that is consumed is calculated as follows: in the case of non-changing the contrast $$100 \text{ sec.} \times 1.2 \text{ mA}/86,400 \text{ sec.} + 40 \text{ uA} = 41.39 \text{ uA}$$

in the case of changing the contrast $$100 \text{ sec.} \times 1.2 \text{ mA}/86400 \text{ sec.} + \left(20 \times \frac{23}{24} + 40 \times \frac{1}{24}\right) \text{uA} = 23.61 \text{ uA}$$

(5) When a cell having a capacity of 120 mAh is used, the serviceable life is calculated as follows:
in the case of non-changing the contrast $$\frac{120 \times 10^{-3}}{41.39 \times 10^{-6}} \div 24 \approx 121 \text{ days}$$

in the case of changing the contrast $$\frac{120 \times 10^{-3}}{23.61 \times 10^{-6}} \div 24 \approx 212 \text{ days}$$

What is claimed is:
1. A data collecting system for collection of data and entry of said data to a host computer comprising:
a portable hand held data collector for collecting data and for transmitting said data externally of the data collector, the data collector comprising
a case of a size and shape to be held by one hand during use,
a keyboard for inputting data and having numeral keys and function keys,
display means for displaying said data,
memory means for storing said data inputted by a user, and
interface means for transmitting said data stored in said memory means to a stationary data relay;

said stationary data relay having means for receiving said data from said data collector and for transmitting said data to said host computer, the data relay including
- a case having means for removably setting said portable data collector thereon,
- first interface means for receiving said data transmitted from said interface means in said data collector, and
- second interface means for communicating bi-directionally to the host computer;

wherein said interface means in said data collector and said first interface means in said data relay have respective circuit means for transmitting said data bi-directionally using electromagnetic induction, and wherein each said circuit means comprises a tuning unit having a coil, and a capacitor connected in parallel with said coil for generating an electromagnetic field when data are transmitted and for generating an electric signal by electromagnetic induction when data are received, a transmitting unit for inputting an electric signal to said tuning unit when data are transmitted, and a receiving unit for outputting said electric signal generated in said tuning unit as serial data, said transmitting unit and said receiving unit being coupled together through a capacitor.

2. The data collecting system claimed in claim 1 wherein said transmitting unit comprises a transmitting transistor and a transistor drive unit connected to the base terminal of said transmitting transistor, said transmitting transistor further comprising an emitter-grounded circuit, and the collector terminal of said transmitting transistor being connected to said coil of said tuning unit through a diode.

3. The data collecting system claimed in claim 1 wherein said receiving unit comprises a high-pass filter comprised of said capacitor coupling said tuning unit and said receiving unit and a resistor connected in series, a receiving transistor and a resistor constituting an emitter-grounded circuit, and a clipping diode which protects said receiving transistor.

* * * * *